United States Patent
Carter et al.

(10) Patent No.: US 12,224,644 B2
(45) Date of Patent: Feb. 11, 2025

(54) MOTOR BEARING PRELOADING SYSTEM WITH PLASTIC ENDBELLS CONFIGURED TO PRELOAD THE BEARING ASSEMBLIES

(71) Applicant: Parker-Hannifin Corporation, Cleveland, OH (US)

(72) Inventors: Joseph B. Carter, Mooresville, NC (US); Peter M. Ranker, Mocksville, NC (US); James M. Campbell, Concord, NC (US)

(73) Assignee: Parker-Hannifin Corporation, Cleveland, OH (US)

( * ) Notice: Subject to any disclaimer, the term of this patent is extended or adjusted under 35 U.S.C. 154(b) by 226 days.

(21) Appl. No.: 17/801,637

(22) PCT Filed: Jan. 29, 2021

(86) PCT No.: PCT/US2021/015674
§ 371 (c)(1),
(2) Date: Aug. 23, 2022

(87) PCT Pub. No.: WO2021/225648
PCT Pub. Date: Nov. 11, 2021

(65) Prior Publication Data
US 2023/0089611 A1 Mar. 23, 2023

Related U.S. Application Data

(60) Provisional application No. 63/020,736, filed on May 6, 2020.

(51) Int. Cl.
*H02K 11/33* (2016.01)
*H02K 5/173* (2006.01)
(Continued)

(52) U.S. Cl.
CPC .......... *H02K 5/1732* (2013.01); *H02K 7/083* (2013.01); *H02K 11/33* (2016.01); *H02K 21/16* (2013.01); *H02K 2211/03* (2013.01)

(58) Field of Classification Search
CPC .. H02K 5/1732; H02K 7/083; H02K 2211/03; F16C 25/083; F16C 19/08; F16C 35/067; F16C 2220/04
(Continued)

(56) References Cited

U.S. PATENT DOCUMENTS 1,822,859 A * 9/1931 Perkins .................... H02K 5/08
310/410
2,280,965 A * 4/1942 Mueller ............... H02K 5/1732
310/90
(Continued)

FOREIGN PATENT DOCUMENTS

JP    S59110921 A    6/1984
WO   2004092582 A2   10/2004

OTHER PUBLICATIONS

International Search Report and Written Opinion mailed May 20, 2021, in corresponding International Application No. PCT/2021/015674.

*Primary Examiner* — Maged M Almawri
(74) *Attorney, Agent, or Firm* — Renner, Otto, Boisselle & Sklar, LLP (57) ABSTRACT

A motor assembly has an enhanced retention system for minimizing axial and radial movement of the bearings and output shaft. A front endbell assembly is fixed to a front end of the motor, the front endbell assembly including a plastic front endbell and a front bearing assembly through which a driving end of the output shaft extends. The plastic front endbell is over-molded about the front bearing assembly and elasticity of the plastic front endbell operates to preload the front bearing assembly to restrict axial movement of the (Continued)

front bearing assembly. Similarly, a rear endbell assembly is fixed to a rear end of the motor opposite from the front end, the rear endbell assembly including a plastic rear endbell and a rear bearing assembly into which a rear end of the output shaft extends. The plastic rear endbell is over-molded about the rear bearing assembly and elasticity of the plastic rear endbell operates to preload the rear bearing assembly to restrict axial movement of the rear bearing assembly. A spring or an appropriately sized output shaft may be used to preload the bearing assemblies oppositely from the over-molded plastic endbells.

16 Claims, 7 Drawing Sheets

(51) Int. Cl.
*H02K 7/08* (2006.01)
*H02K 21/16* (2006.01)

(58) Field of Classification Search
USPC .................................. 310/401–410, 43–45
See application file for complete search history.

(56) References Cited

U.S. PATENT DOCUMENTS

| | | | | |
|---|---|---|---|---|
| 2,763,796 | A * | 9/1956 | Happe | H02K 9/06 310/410 |
| 2,874,008 | A * | 2/1959 | Orte | H02K 5/1732 384/220 |
| 3,234,417 | A * | 2/1966 | Tolmie | H02K 1/17 310/410 |
| 3,444,402 | A * | 5/1969 | Cartier | H02K 23/04 310/46 |
| 3,873,861 | A * | 3/1975 | Halm | H02K 1/185 310/410 |
| 4,384,226 | A | 5/1983 | Sato | |
| 4,896,239 | A * | 1/1990 | Ghose | H02K 7/1004 360/267 |
| 4,899,432 | A * | 2/1990 | Adam | H02K 5/1672 310/90 |
| 4,933,581 | A * | 6/1990 | Shramo | H02K 21/14 310/156.55 |
| 5,325,007 | A * | 6/1994 | Huss | H02K 3/46 310/43 |
| 6,020,661 | A | 2/2000 | Trago et al. | |
| 6,124,656 | A * | 9/2000 | Jensen | B65G 39/02 310/90 |
| 6,388,351 | B1 * | 5/2002 | Fisher | H02K 5/1732 310/90 |
| 6,517,251 | B1 | 2/2003 | Williams | |
| 6,664,676 | B1 | 12/2003 | Yoshida et al. | |
| 8,040,005 | B2 | 10/2011 | Bhatti | |
| 8,096,043 | B2 | 1/2012 | Hargraves et al. | |
| 8,283,841 | B2 * | 10/2012 | Lin | H02K 5/161 310/90 |
| 8,415,840 | B2 * | 4/2013 | Liu | H02K 5/1672 310/90 |
| 9,006,961 | B2 * | 4/2015 | Helmi | H02K 3/50 310/71 |
| 10,439,464 | B2 * | 10/2019 | Zhi | H02K 5/161 |
| 2003/0086630 | A1 * | 5/2003 | Bramel | H02K 11/40 384/476 |
| 2004/0178692 | A1 * | 9/2004 | Wright | H02K 5/15 310/401 |
| 2006/0181168 | A1 * | 8/2006 | Hargraves | F04B 17/03 310/90 |
| 2006/0220474 | A1 | 10/2006 | Yoshida | |
| 2011/0037352 | A1 * | 2/2011 | Lin | H02K 5/15 310/402 |
| 2012/0019080 | A1 | 1/2012 | Kottmyer et al. | |
| 2012/0274167 | A1 | 11/2012 | Kim et al. | |
| 2019/0115799 | A1 * | 4/2019 | Horng | F16C 25/083 |
| 2019/0372421 | A1 * | 12/2019 | Amaya | H02K 1/185 |
| 2022/0337118 | A1 * | 10/2022 | Shirai | F16C 35/063 |
| 2023/0268793 | A1 * | 8/2023 | Tong | H02K 7/145 310/51 |
| 2023/0344325 | A1 * | 10/2023 | Hwang | A47L 5/28 |

* cited by examiner

MOTOR BEARING PRELOADING SYSTEM WITH PLASTIC ENDBELLS CONFIGURED TO PRELOAD THE BEARING ASSEMBLIES

This application is a national phase of International Application No. PCT/US2021/015674 filed Jan. 29, 2021, which claims priority to U.S. Application No. 63/020,736 filed May 6, 2020, each of which is hereby incorporated herein by reference in its entirety.

FIELD OF INVENTION

The present application relates to motor configurations, such as for motors that drive a hydraulic fluidic pump, and more particularly to motor configurations that substantially eliminate or restrict radial play in the bearing components.

BACKGROUND OF THE INVENTION

Motors that drive an output shaft to impart a rotational motion may be employed in a variety of applications. For example, conventional fluidic pumps typically employ motors, and often brushless DC motors, in which the motor bearings are preloaded and locked to remove radial play in the bearings. Because of the nature of pump operation, oscillating torque or radial loads are constantly being applied about the motor output shaft and the associated bearings. To prevent rattling and wear on the bearing components that support the motor output shaft, the bearing components may be preloaded to restrict axial movement and radial play of the bearings.

Conventional methods to assemble brushless DC motors for fluidic pumps without radial or axial movement of the bearings tend to be complex and costly, with restricted movement of the bearings and associated output shaft being a challenge to control. Existing methods use machined or cast metal parts requiring additional labor and material cost, and the bearing system is locked into position using press-fit components, adhesives, or other methods to retain the bearings. Such bearing systems can be sensitive to shock, vibration, temperature shift, and other factors that affect a locked bearing system.

SUMMARY OF THE INVENTION

Embodiments of the present application include a motor assembly that has a motor bearing retention system for the restriction of radial play or radial movement in the bearing system. The motor bearing retention system utilizes plastic endbells that are over-molded about the bearings through or into which the motor output shaft extends to drive a pump. The motor assembly configuration, and in particular the use of over-molded plastic endbells, allows for reduced cost of motor production while maintaining a reliable bearing retention system accounting for a radial dynamic load with negligible radial movement in the motor output shaft and bearings. The use of an over-molded plastic endbell provides a bearing system that is more resistant to shock loads and temperature variations as compared to conventional configurations. During or after strain, the plastic endbell and associated components return without permanent deformation to the original state, which provides enhanced dampening for absorption of vibration and shock loads.

In exemplary embodiments, the motor assembly configuration includes a motor, such as for example a brushless DC motor, with over-molded plastic endbell components. Bearings that support the motor output shaft, which may be configured as ball bearings, are over-molded within a plastic front endbell component on the front end of the motor assembly through which a driving end of the output shaft extends, and within a plastic rear endbell component on the rear end of the motor assembly into which a second end of the output shaft extends. The endbell components are secured onto a stator coil assembly, with the motor output shaft being supported by the bearings in the endbells. The elasticity of the over-molded endbells essentially act as a spring to preload the respective bearings to restrict axial movement of the bearings under oscillating radial loads common in fluidic pump systems. The configuration utilizes the elasticity of the endbells for retention with limited flexibility, and the radial and axial movement of the bearings are restricted by locking the outer diameter and inner diameter bearing locations. In an exemplary embodiment, a spring is used to provide outward preloading forces oppositely from inward preloading forces generated by the over-mold plastic endbells. In another exemplary embodiment, the output shaft is sized such than when the output shaft is incorporated into the motor assembly with the over-molded endbells, the output shaft is placed under load to apply the outward preloading forces oppositely from inward preloading forces generated by the over-mold plastic endbells.

As aspect of the invention, therefore, is a motor assembly having an enhanced retention system for preloading the bearings that support the output shaft. In exemplary embodiments, the motor assembly includes a motor that drives an output shaft. A front endbell assembly is fixed to a front end of the motor, the front endbell assembly including a plastic front endbell and a front bearing assembly through which a driving end of the output shaft extends, wherein the plastic front endbell is over-molded about the front bearing assembly and elasticity of the plastic front endbell operates to preload the front bearing assembly to restrict axial movement of the front bearing assembly. Similarly, a rear endbell assembly is fixed to a rear end of the motor opposite from the front end, the rear endbell assembly including a plastic rear endbell and a rear bearing assembly into which a rear end of the output shaft extends, wherein the plastic rear endbell is over-molded about the rear bearing assembly and elasticity of the plastic rear endbell operates to preload the rear bearing assembly to restrict axial movement of the rear bearing assembly.

In exemplary embodiments, the front bearing assembly is configured as a front ball bearing including a front inner race and a front outer race that define a track that receives a front ball bearing, and the plastic front endbell is over-molded about the front outer race to apply an inward preloading force to the front outer race, and the elasticity of the plastic front endbell operates to hold the front outer race of the front bearing assembly to restrict axial movement of the front bearing assembly outer race. The rear bearing assembly similarly is configured as a rear ball bearing including a rear inner race and a rear outer race that define a track that receives a rear ball bearing, and the plastic rear endbell is over-molded about the rear outer race to apply an inward preloading force to the rear outer race oppositely from the preloading force applied to the front outer race, and the elasticity of the plastic rear endbell operates to hold the rear outer race of the rear bearing assembly to restrict axial movement of the rear bearing assembly outer race.

In exemplary embodiments, motor assembly further includes a preloading force mechanism that imparts opposing outward forces on the front inner race versus the rear inner race. The motor assembly further may include a spring that applies an outward spring force on the output shaft to urge a front shoulder of the output shaft against the font inner race to apply an outward preloading force against the front inner race oppositely from the preloading force applied to the front outer race, and the spring may be positioned against the rear inner race the to apply an outward preloading force against the rear inner race oppositely from the preloading force applied to the rear outer race. The configuration may be reversed, in which the output shaft has a rear shoulder that interacts against the rear inner race and the spring is positioned against the front inner race. In another exemplary embodiment, the output shaft is sized such that when the output shaft is incorporated into the motor assembly with the over-molded front and rear plastic endbells, the output shaft is placed under load to apply the opposing outward preloading forces on the front inner race and the rear inner race.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Embodiments of the present application will now be described with reference to the drawings, wherein like reference numerals are used to refer to like elements throughout. It will be understood that the figures are not necessarily to scale.

Figure 1A:
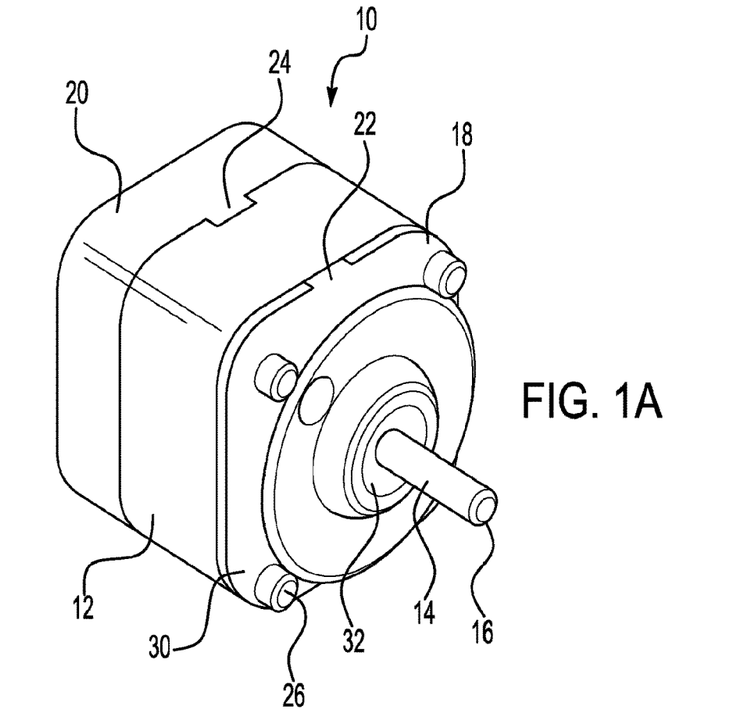
FIG. 1A and FIG. 1B are drawings depicting isometric views from different viewpoints of an exemplary motor assembly in accordance with embodiments of the present application.
Figure 1B:
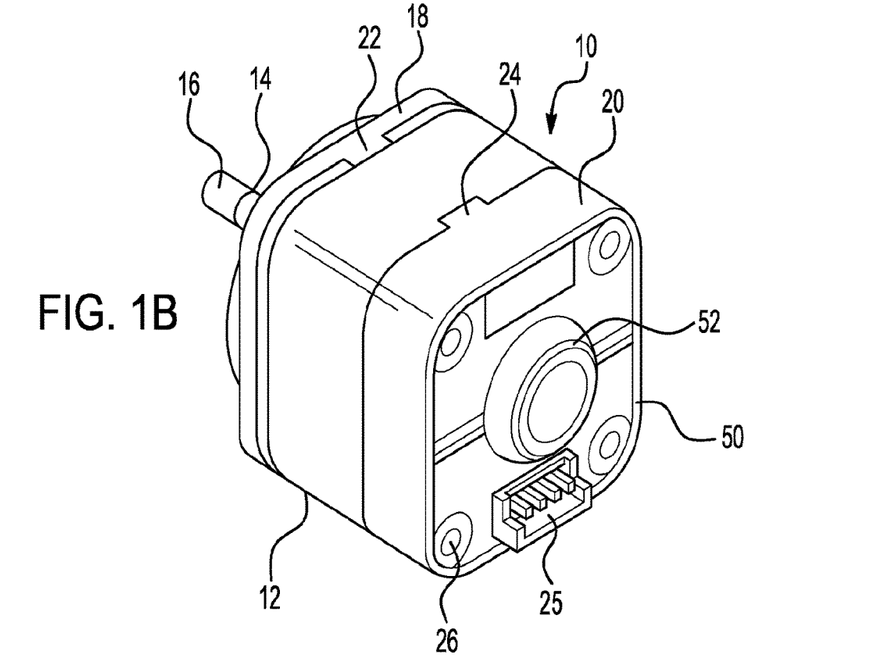

FIG. 1A and FIG. 1B are drawings depicting isometric views from different viewpoints of an exemplary motor assembly 10 in accordance with embodiments of the present application. In exemplary embodiments, the motor assembly configuration includes a motor, such as for example a brushless DC motor, with over-molded plastic endbell components. Referring to FIGS. 1A and 1B, a motor assembly 10 includes a motor 12 that may be a brushless DC motor having a wound stator assembly and rotor hub as are known in the art. As further detailed below, the wound stator assembly interacts with a rotor hub to drive an output shaft 14, with a driving end 16 of the output shaft 14 being visible in FIGS. 1A and 1B.

The motor assembly 10 further includes a front endbell assembly 18 through which the driving end 16 of the output shaft 14 extends, and a rear endbell assembly 20. The front endbell assembly 18 and rear endbell assembly 20 are fixed to opposite sides of the motor 12. In particular, the front endbell assembly 18 is fixed to a front end of the motor 12, and the rear front endbell assembly 20 is fixed to a rear end of the motor 12 opposite from the front end. In exemplary embodiments, the front endbell assembly 18 and the rear endbell assembly 20 respectively are aligned with each other and with respect to the motor 12 using respective alignment tabs 22 and 24, whereby the alignment tabs aid in locating the components with respect to each other during assembly to ensure a proper assembly alignment. Fastening elements 26, such as bolts, screws, or the like may extend through the components of the motor assembly 10 to fix the front endbell assembly 18 and the rear endbell assembly 20 to the motor 12 to form the complete motor assembly 10. The rear endbell assembly 20 further may include a power connector 25 for the connection of a power supply to the motor assembly 10.

The front endbell assembly 18 includes a front plastic endbell 30 and a front bearing assembly 32 that supports the motor output shaft 14. As referenced above, a driving end 16 of the motor shaft 14 extends through the front endbell assembly 18, and particularly through the front bearing assembly 32. The rear endbell assembly 20 includes a rear endbell 50 and a rear bearing assembly 52 that further supports the motor output shaft 14. In particular, a rear end 17 (see FIGS. 5 and 6) of the motor shaft 14 opposite from the driving end 16 extends into the rear endbell assembly 20, and particularly into the rear bearing assembly 52.

Figure 2A:
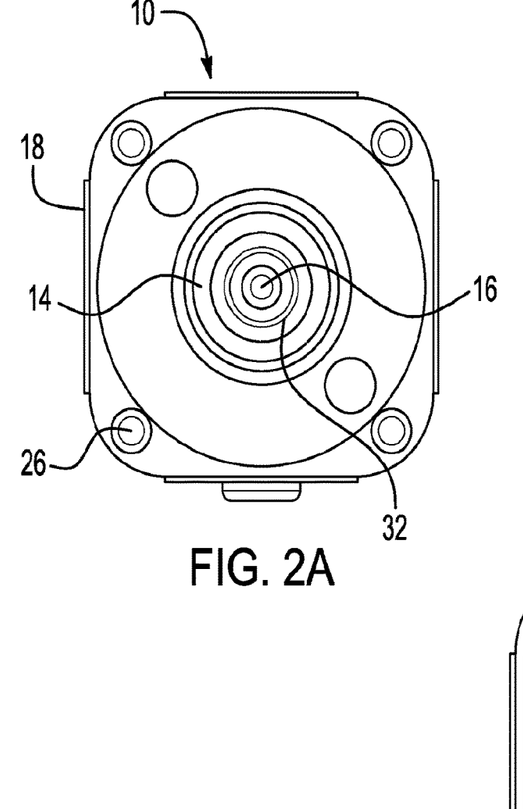
FIG. 2A is a front end view of the exemplary motor assembly of FIGS. 1A and 1B.
Figure 2B:
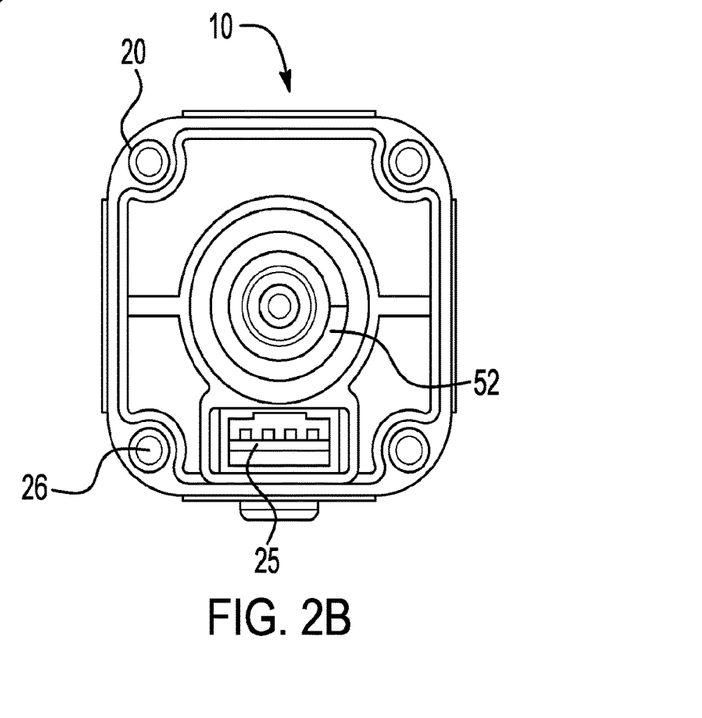
FIG. 2B is a rear end view of the exemplary motor assembly of FIGS. 1A and 1B.
Figure 3:
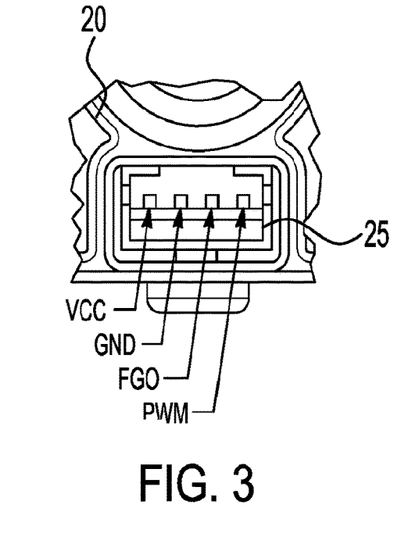
FIG. 3 is close-up view of the exemplary motor assembly from the rear viewpoint of FIG. 2B, focusing on the associated power connections.

FIG. 2A is a front end view of the motor assembly 10 of FIGS. 1A and 1B, and FIG. 2B is a rear end view of the motor assembly 10 of FIGS. 1A and 1B. Accordingly, like reference numerals are used in FIGS. 2A/2B as in FIGS. 1A/1B. FIG. 2A illustrates the centralized location of the output shaft 14 with the driving end 16 extending from the front bearing assembly 32 of the front endbell assembly 18. The output shaft 14 is positioned with the rear end 17 (see FIGS. 5 and 6) being positioned within the rear bearing assembly 52 of the rear endbell assembly 20. FIG. 3 is close-up view of the motor assembly 10 from the rear end viewpoint of FIG. 2B, focusing on associated power connections 25. In this example, as is common in the art, the power connections 25 are configured as a four-pin power connection including VCC, GND, FGO, and PWM ports for power pin connections as are known in the art.

Figure 4:
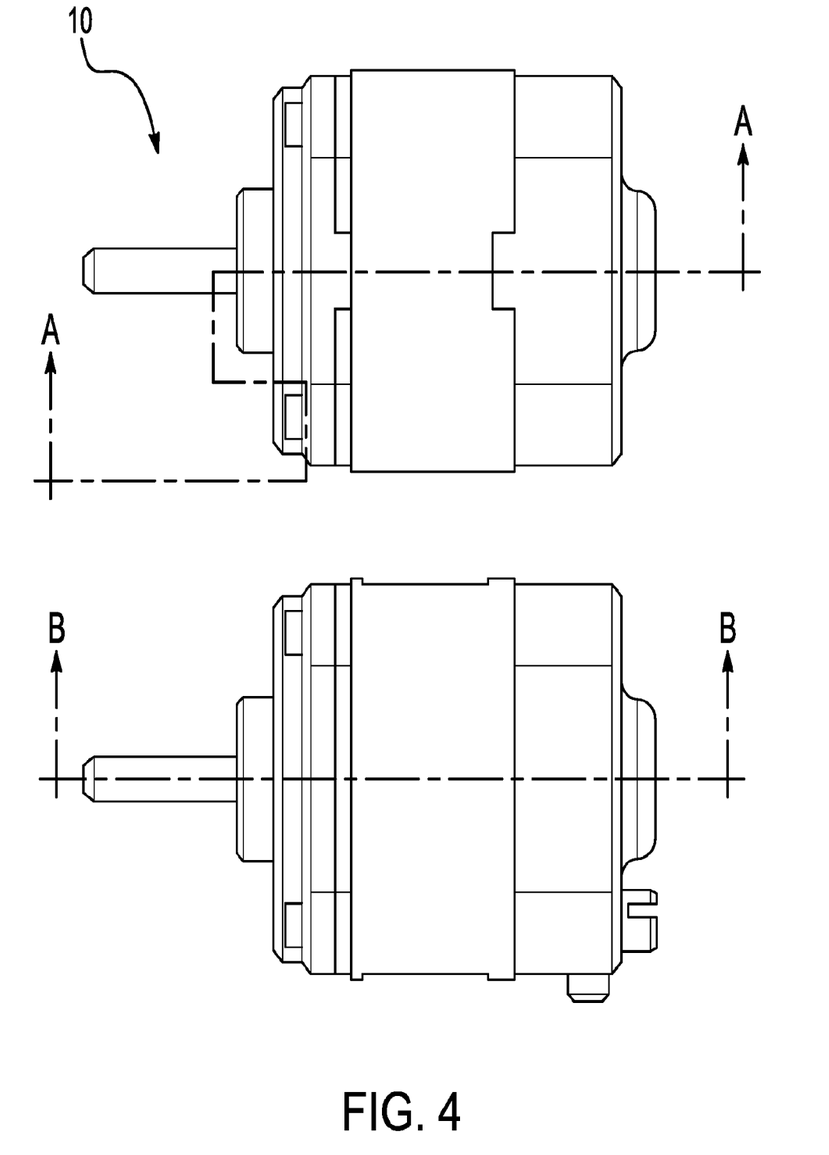
FIG. 4 includes multiple drawings depicting a side view of the exemplary motor assembly of FIGS. 1A and 1B to define different cross sections.
Figure 5:
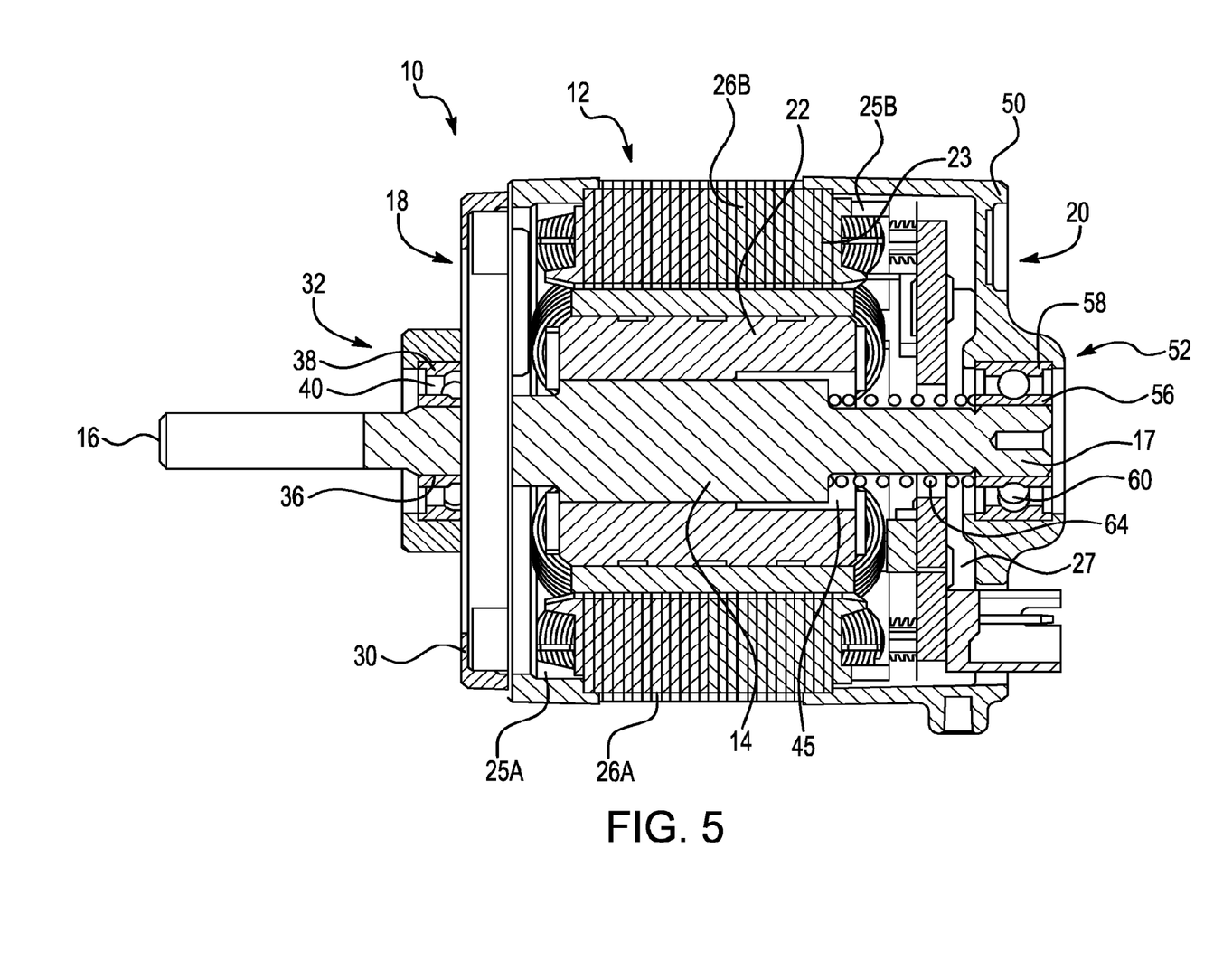
FIG. 5 is a drawing depicting a side cross sectional view of the exemplary motor assembly along the line A-A indicated in the top portion of FIG. 4.
Figure 6:
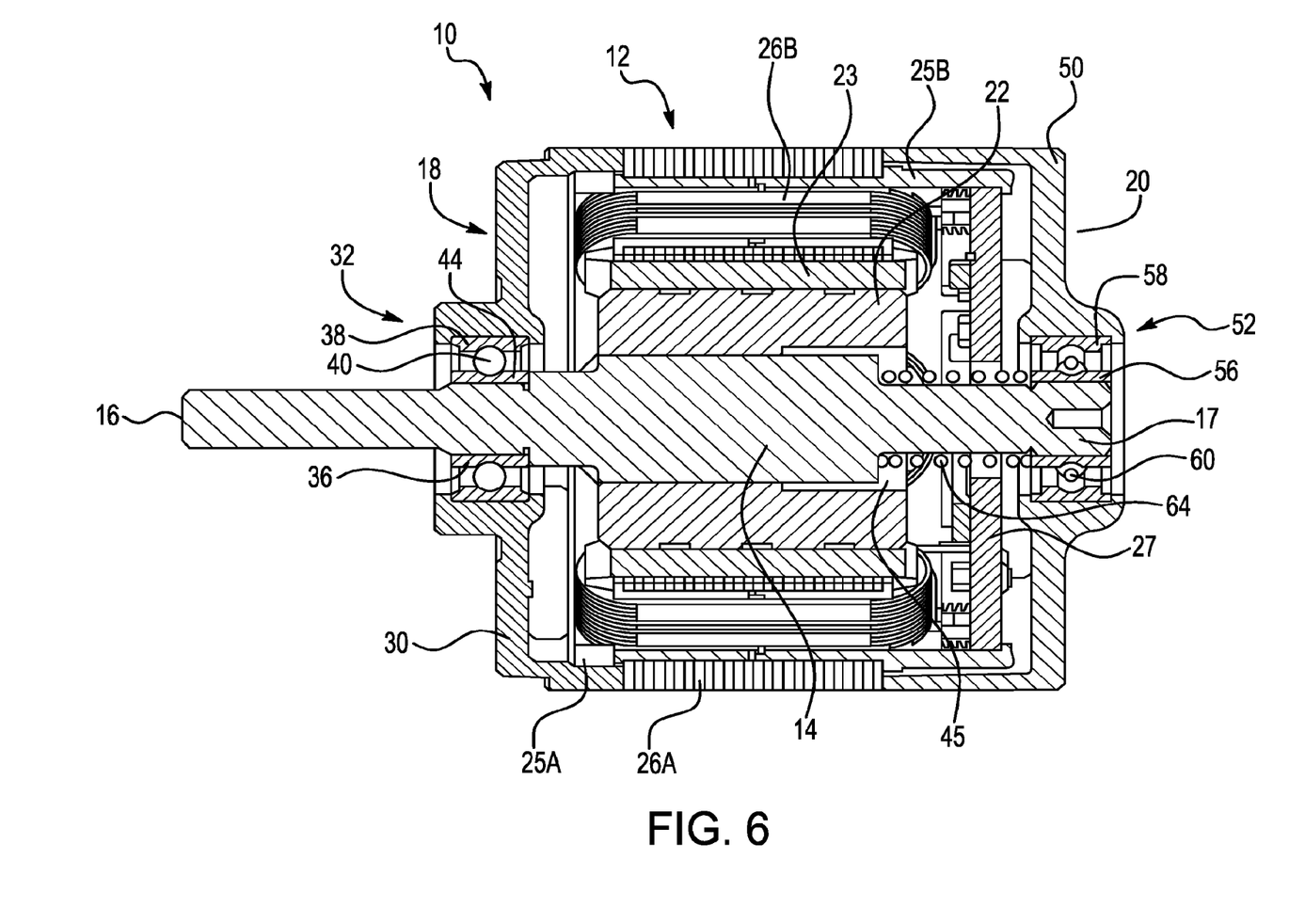
FIG. 6 is a drawing depicting a side cross sectional view of the exemplary motor assembly along the line B-B indicated in the bottom portion of FIG. 4.

FIG. 4 includes multiple drawings depicting a side view of the exemplary motor assembly 10 of FIGS. 1A and 1B to define different cross sections. FIG. 5 is a drawing depicting a side cross sectional view of the exemplary motor assembly 10 along the line A-A indicated in the top portion of FIG. 4, and FIG. 6 is a drawing depicting a side cross sectional view of the exemplary motor assembly 10 along the line B-B indicated in the bottom portion of FIG. 4. Referring to the cross-sectional views of FIGS. 5 and 6, in a brushless DC motor configuration of the motor assembly 10, the motor 12 is configured as a wound stator assembly that houses a rotor hub 22 that drives the output shaft 14. The rotor hub 22 in turn is driven by interaction of a permanent magnet 23 with one or more wound coils when the coil(s) are energized as is conventional. In the example of FIGS. 5 and 6, the motor assembly 10 includes a front winding insert 25A and a first stator coil 26A, and a rear winding insert 25B and a second stator coil 26B. The front winding insert in conjunction with the rear winding insert hold the stator coils and isolate them from the stator laminations. The motor 12 further includes a motor control board 27 that may incorporate any suitable electronics for operational control of the motor. Operation of the brushless DC motor 12 configured as a wound stator assembly drives the output shaft 14 for operational driving of an external element, such as for example operating a fluidic pump.

As referenced above, the motor assembly 10 further includes the front endbell assembly 18, and the front endbell assembly 18 includes the front plastic endbell 30 and the front bearing assembly 32. In exemplary embodiments, the front plastic endbell 30 is over-molded onto the front bearing assembly 32. The front bearing assembly 32 may be configured as a ball bearing as are common in the art, including a front inner race 36 spaced apart from a front outer race 38 that define a track for receiving one or more front ball bearings 40. For assembly, the front plastic endbell 30 is over-molded onto the front bearing assembly 32 radially outward relative to the outer race 38. The rotor hub 22 and the output shaft 14 are formed into a sub-assembly and then press fit and bonded into the front endbell assembly 18, with the output shaft 14 being adjacent the inner race 36. The output shaft 14 may include a front shoulder 44 (see particularly the view of FIG. 6) and a rear shoulder 45, and with the press fit configuration, the front shoulder 44 of the output shaft 14 interacts against the front inner race 36 of the bearing assembly 32.

As referenced above, the motor assembly 10 further includes the rear endbell assembly 20. The rear endbell assembly 20 includes the rear plastic endbell 50 that provides a housing for the rear bearing assembly 52. In exemplary embodiments, the rear plastic endbell 50 is over-molded onto the rear bearing assembly 52. The rear bearing assembly 52 may be configured similarly as the front bearing assembly 32. Accordingly, the rear bearing assembly 52 also may be configured as a ball bearing as are common in the art, including a rear inner race 56 spaced apart from a rear outer race 58 that define a track for receiving one or rear ball bearings 60. In the exemplary embodiment of FIGS. 5 and 6, the motor assembly 10 includes a spring 64 that extends around the rear end 17 of the output shaft 14. When the components of the motor assembly 10 are assembled, the spring 64 is compressed between the output shaft 14 and the rear bearing assembly 52, and more particularly between the rear shoulder 45 of the output shaft 14 and the rear inner race 56 of the rear bearing assembly 52.

In general, bearing preload refers to applying a load to one of the bearing races while holding the other bearing race stationary, or in other words applying opposite axial loads to the inner and outer races of the bearing assemblies. The bearing balls are held in the track defined by the bearing races that has room for radial movement due to tolerancing. Axial preloads press the outer and inner bearing races in opposite directions, which eliminates the radial play in the ball bearing track by anchoring the inner and outer races of the bearing assemblies. Embodiments of the present application provide an enhanced configuration for implementing such bearing preloads to restrict unwanted movement of the bearing assemblies, and thereby the output shaft, which prevents rattling and wear.

Figure 7:
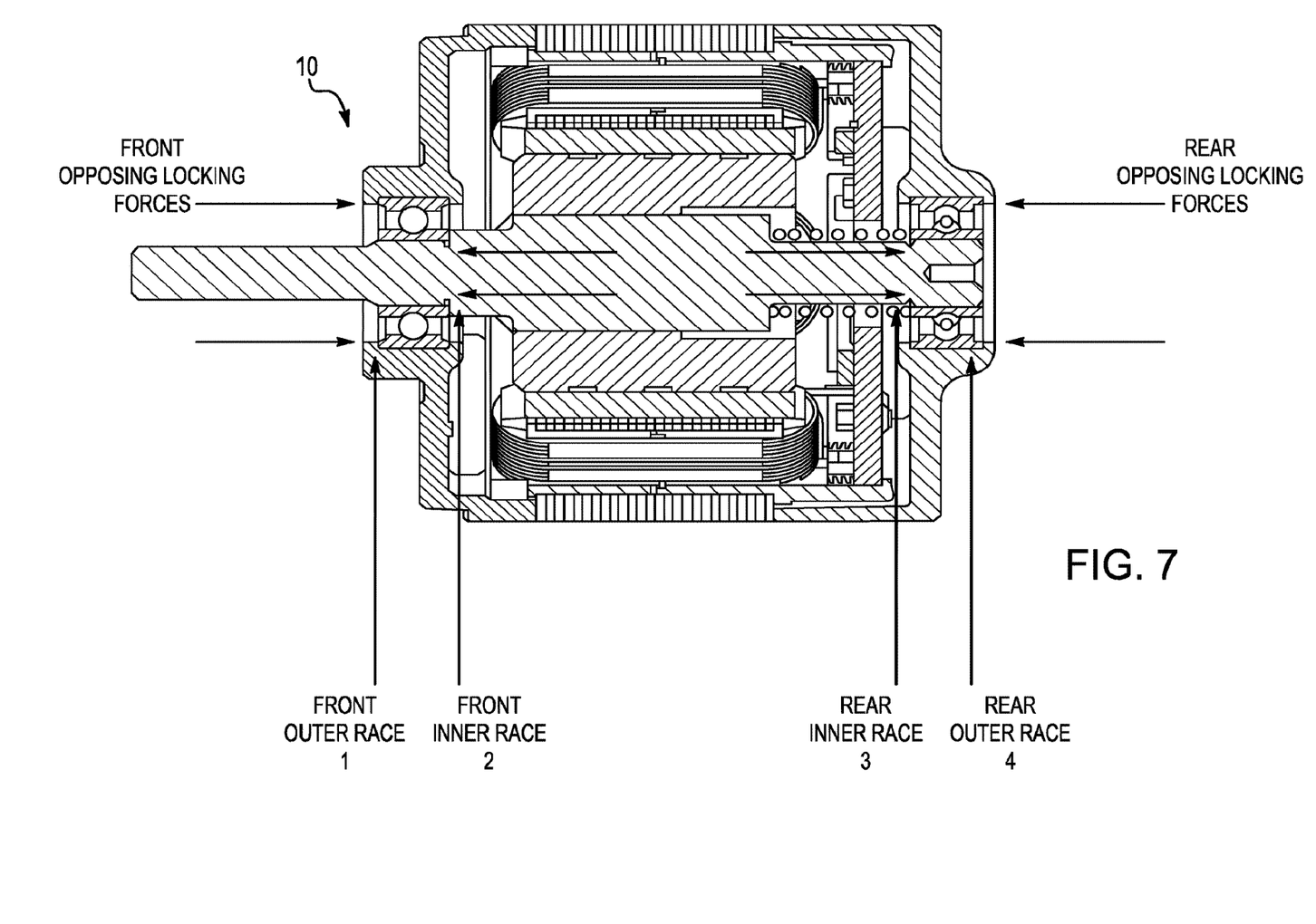
FIG. 7 is a drawing illustrating the viewpoint of the motor assembly shown in FIG. 6, illustrating the concept of bearing preload as performed in embodiments of the present application.

FIG. 7 is a drawing illustrating the viewpoint of the motor assembly 10 shown in FIG. 6, illustrating the concept of bearing preload as performed in embodiments of the present application. For ease of viewing, reference numerals in FIG. 6 are omitted in FIG. 7, so accordingly the two figures are considered together for identification of like components. As described above, in the motor assembly 10 there is a front bearing assembly 32 and a rear bearing assembly 52, with each of the bearing assemblies including an inner race 36/56 and an outer race 38/58. The output shaft 14 is held or supported by the two inner races of the front and rear bearing assemblies. As illustrated in FIG. 7, the result is that there are four anchor points that must be secured when properly preloading the bearings. As identified in FIG. 7, the four anchor points include (1) the front outer race, (2) the front inner race, (3) the rear inner race, and (4) the rear outer race. The front and rear bearing assemblies cannot be preloaded independently because the output shaft is essentially floating on the inner races of the bearing assemblies, and therefore the front and rear bearing assemblies are preloaded in tandem as described in more detail below.

The horizontal arrows in FIG. 7 show that equal and opposing front and rear locking forces are applied at the four anchor points to lock the front and rear bearing assemblies. In particular, equal and opposite front and rear locking forces are applied to the inner race anchor point as compared to outer race anchor point of a given bearing assembly (i.e., force at anchor point (1) is equal and opposite to force at anchor point (2), and force at anchor point (3) is equal and opposite to force at anchor point (4)), and equal and opposite front and rear locking forces are applied to the front bearing assembly races as compared to the analogous rear bearing assembly races (i.e., force at anchor point (1) is equal and opposite to force at anchor point (4), and force at anchor point (2) is equal and opposite to force at anchor point (3)). Such configuration of preloading locking forces locks the bearings assemblies, and when the bearing assemblies are locked in such fashion, the output shaft cannot move axially and the inner and outer races of the bearing assemblies also cannot move axially.

As referenced above, embodiments of the present application provide an enhanced configuration for implementing such bearing preloads. The elasticity of the over-molded front plastic endbell 30 operates comparably as a spring to preload the front bearing assembly 32 to restrict the front bearing races axially to prevent radial play of the front ball bearings 40. In this manner, the elasticity of the over-molded front endbell 30 acts to preload the front bearing assembly at the front outer race anchor point (1) of FIG. 7. Referring to the front bearing assembly, the elasticity of the plastic front endbell operates to hold the front outer race of the front bearing assembly to restrict axial movement of the front bearing outer race. Similarly, the elasticity of the over-molded rear plastic endbell 50 operates comparably as a spring to preload the rear bearing assembly 52 to restrict the rear bearing races axially to prevent radial play of the rear ball bearings 60. In this manner, the elasticity of the over-molded rear endbell 50 acts to preload the rear bearing assembly at the rear outer race anchor point (4) of FIG. 7.

Referring to the rear bearing assembly, the elasticity of the plastic rear endbell operates to hold the rear outer race of the rear bearing assembly to restrict axial movement of the rear bearing outer race. Again, the preloading locking forces at anchor points (1) and (4) due to preloading by the over-molded endbells 30 and 50 are equal and opposite in the inward direction as shown in the arrows of FIG. 7.

In the embodiment of FIGS. 5-7, the opposing outward forces at anchor points (2) and (3) are implemented using the spring 64. When the motor assembly components are assembled, the spring 64 is compressed to generate an outward spring force. As referenced above, the output shaft 14 includes the front shoulder 44 and the rear shoulder 45. The compression of the spring 64 generates an outward force on the output shaft 14 at the rear shoulder 45, and such force on the output shaft is applied to the inner race 36 of the front bearing assembly 32 by the front shoulder 44 of the output shaft. In addition, the spring 64 is positioned against the inner race 56 of the rear bearing assembly 52. Accordingly, the compression of the spring 64 generates an opposite outward force on the inner race 56 of the rear bearing assembly 52. In this manner, the compression of the spring 64 during assembly operates to generate opposing outward forces that act to preload the front bearing assembly at the front inner race anchor point (2), and act to preload the rear bearing assembly at the rear inner race anchor point (3) of FIG. 7. Again, the preloading locking forces at anchor points (2) and (3) due to preloading by the spring force are equal and opposite in the outward direction, and further are equal and opposite to the inward preloading locking forces respectively at anchor points (1) and (4) applied by the elasticity of the over-molded endbells, as shown in FIG. 7. The configuration may be reversed, in which the output shaft has a rear shoulder that interacts against the rear inner race and the spring is positioned against the front inner race.

Accordingly, the combination of the over-molded plastic endbells to preload the bearing assemblies at the outer races, combined with the interaction of the spring force against the output shaft at the front inner race and the spring force against the rear inner race, operates to lock the front and rear bearing assemblies at both the inner and outer race anchor points. The elasticity of the over-molded endbells is thus suitable to restrict radial movement of the bearings under oscillating radial loads common in fluidic pump systems. The particular use of over-molded plastic endbells for preloading the bearing assemblies provides a bearing retention system that is more resistant to shock loads and temperature variations as compared to conventional configurations. During or after strain, the plastic endbells and associated components return without permanent deformation to the original state, which provides enhanced dampening for absorption of vibration and shock loads. Using over-molded plastic endbells further allows for reduced cost of motor production while maintaining a reliable bearing retention system accounting for a radial dynamic load with negligible radial movement in the output shaft and bearing assemblies. The dual preloading of both the front and rear bearing assemblies provides a locking of all four bearing assembly anchor points to provide a better retention system to prevent such radial movement of the bearing assemblies and in turn the output shaft.

In the embodiment of FIGS. 5-7, the front and rear outer race anchor points (1) and (4) are locked in place by being over-molded by the front and rear plastic endbells, and the spring force is applied to the rear inner race with a hard stop being applied using the front shoulder of the output shaft at the front inner race to urge the bearing inner races away from each other. In a variation on such implementation, the reverse configuration may be employed, whereby the spring force is applied to the front inner race with a hard stop being applied using the rear shoulder of the output shaft against the rear inner race to urge the bearing inner races away from each other. Generally, any suitable configuration may be employed whereby the motor assembly includes a preloading force mechanism that imparts opposing outward forces on the front inner race versus the rear inner race, i.e., the preloading force mechanism urges the front inner race forward while urging the rear inner race rearward.

Figure 8:
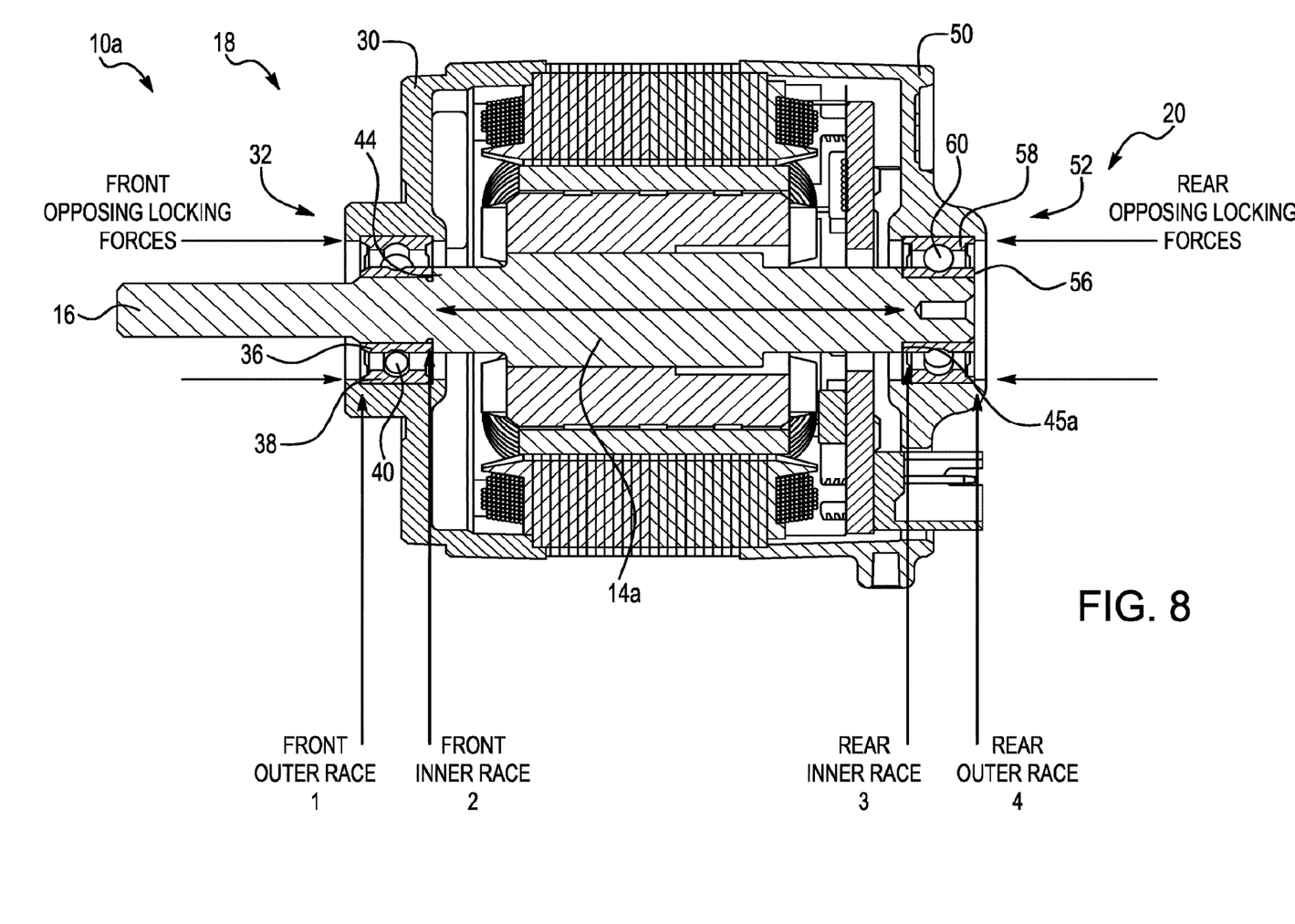
FIG. 8 is a drawing depicting another exemplary motor assembly in accordance with embodiments of the present application, which illustrates a variation of applying opposing forces on the bearing assembly inner races.

In this regard, FIG. 8 is a drawing depicting an exemplary motor assembly 10*a* in accordance with embodiments of the present application, which applies the opposing preloading forces on the bearing assembly inner races without employing the spring as in the previous embodiment. Like components are identified in FIG. 8 with reference numerals commonly as in FIG. 6, with focus on the components relating to the preloading of the anchor points. In the embodiment of FIG. 8, an alternative output shaft 14*a* is configured with two hard stops that respectively make contact with the inner race 36 of the front bearing assembly 32 and the inner race 56 of the rear bearing assembly 52. The length of the output shaft 14*a* is sized such that when the motor assembly 10*a* with the over-molded endbells 30 and 50 is assembled, the output shaft 14*a* is placed under load with the two hard stops constituting contact points that press outward as shown by the arrow along the output shaft 14*a* in FIG. 8.

Essentially, the output shaft 14*a* is sized such that upon assembly or fitting into the over-molded the endbells 30 and 50, an outward axial load is applied in both opposing outward directions at the two hard stops as shown in FIG. 8. The first hard stop is provided by the front shoulder 44 of the output shaft 14*a* interacting against the front inner race 36 of the front bearing assembly 32, similarly as in the previous embodiment. The second hard stop is provided by a rear shoulder 45*a* of the output shaft 14*a*. In the embodiment of FIG. 8 in which the spring is omitted, the rear shoulder 45*a* is positioned to interact against the rear inner race 56 of the rear bearing assembly 52. In this manner, the hard stops of the output shaft provide the opposing outward preloading locking forces on the inner races at anchor points (2) and (3). In addition, similarly as in the previous embodiment, the elasticity of the over-molded endbells 30 and 50 results in a preloading spring action that acts against the outer races 38 and 58 of the bearing assemblies. In this manner, the elasticity of the over-molded endbells provides the opposing inward preloading locking forces on the outer races at anchor points (1) and (4), thereby locking all four anchor points.

As aspect of the invention, therefore, is a motor assembly having an enhanced retention system for preloading the bearings that support the output shaft. In exemplary embodiments, the motor assembly includes a motor that drives an output shaft; a front endbell assembly fixed to a front end of the motor, the front endbell assembly including a plastic front endbell and a front bearing assembly through which a driving end of the output shaft extends, wherein the plastic front endbell is over-molded about the front bearing assembly and elasticity of the plastic front endbell operates to preload the front bearing assembly to restrict axial movement of the front bearing assembly; and a rear endbell assembly fixed to a rear end of the motor opposite from the front end, the rear endbell assembly including a plastic rear endbell and a rear bearing assembly into which a rear end of the output shaft extends, wherein the plastic rear endbell is over-molded about the rear bearing assembly and elasticity of the plastic rear endbell operates to preload the rear bearing assembly to restrict axial movement of the rear bearing assembly. The motor assembly may include one or more of the following features, either individually or in combination.

In an exemplary embodiment of the motor assembly, the front bearing assembly is configured as a front ball bearing including a front inner race and a front outer race that define a track that receives a front ball bearing, and the plastic front endbell is over-molded about the front outer race to apply an inward preloading force to the front outer race, and wherein the elasticity of the plastic front endbell operates to hold the front outer race of the front bearing assembly to restrict axial movement of the front bearing outer race.

In an exemplary embodiment of the motor assembly, the rear bearing assembly is configured as a rear ball bearing including a rear inner race and a rear outer race that define a track that receives a rear ball bearing, and the plastic rear endbell is over-molded about the rear outer race to apply an inward preloading force to the rear outer race oppositely from the preloading force applied to the front outer race, and wherein the elasticity of the plastic rear endbell operates to hold the rear outer race of the rear bearing assembly to restrict axial movement of the rear bearing outer race.

In an exemplary embodiment of the motor assembly, the motor assembly further includes a preloading force mechanism that imparts opposing outward forces on the front inner race versus the rear inner race.

In an exemplary embodiment of the motor assembly, the output shaft includes a shoulder that interacts against the front or rear inner race to apply an outward preloading force to said front or rear inner race oppositely from the preloading force applied to an opposing one of the outer races.

In an exemplary embodiment of the motor assembly, the motor assembly further includes a spring that applies an outward spring force on the output shaft to urge the shoulder against said front or rear inner race to apply the outward preloading force against said front or rear inner race.

In an exemplary embodiment of the motor assembly, the spring is positioned against the other of the rear or front inner race the to apply an outward preloading force against the other of the front or rear inner race oppositely from the preloading force applied to the opposing outer race.

In an exemplary embodiment of the motor assembly, the output shaft includes a front shoulder that interacts against the front inner race to apply an outward preloading force to the front inner race oppositely from the preloading force applied to the front outer race.

In an exemplary embodiment of the motor assembly, the motor assembly further includes a spring that applies an outward spring force on the output shaft to urge the front shoulder against the front inner race to apply the outward preloading force against the front inner race.

In an exemplary embodiment of the motor assembly, the spring is positioned against the rear inner race the to apply an outward preloading force against the rear inner race oppositely from the preloading force applied to the rear outer race.

In an exemplary embodiment of the motor assembly, the output shaft includes a rear shoulder that interacts against the rear inner race to apply an outward preloading force to the rear inner race oppositely from the preloading force applied to the rear outer race, wherein the output shaft is sized such that when the output shaft is incorporated into the motor assembly with the over-molded plastic front and rear endbells, the output shaft is placed under load to apply the outward preloading forces on the front inner race and the rear inner race.

In an exemplary embodiment of the motor assembly, the motor is a brushless DC motor.

In an exemplary embodiment of the motor assembly, the motor comprises a wound stator assembly and a rotor hub, wherein the wound stator assembly interacts with the rotor hub to drive the output shaft.

In an exemplary embodiment of the motor assembly, the motor further comprises a motor control board having electronics for operational control of the motor Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A motor assembly comprising:
    a motor that drives an output shaft;
    a front endbell assembly fixed to a front end of the motor, the front endbell assembly including a plastic front endbell and a front bearing assembly through which a driving end of the output shaft extends, wherein the plastic front endbell is over-molded about the front bearing assembly and elasticity of the plastic front endbell is configured to apply a front inward biasing force opposite a front outward biasing force at a front anchoring point to preload the front bearing assembly to restrict axial movement of the front bearing assembly; and
    a rear endbell assembly fixed to a rear end of the motor opposite from the front end, the rear endbell assembly including a plastic rear endbell and a rear bearing assembly into which a rear end of the output shaft extends, wherein the plastic rear endbell is over-molded about the rear bearing assembly and elasticity of the plastic rear endbell is configured to a apply a rear inward biasing force opposite a rear outward biasing force at a rear anchoring point to preload the rear bearing assembly to restrict axial movement of the rear bearing assembly.

2. The motor assembly of claim 1, wherein the motor further comprises a motor control board having electronics for operational control of the motor.

3. The motor assembly of claim 1, wherein the motor is a brushless DC motor.

4. The motor assembly of claim 3, wherein the motor comprises a wound stator assembly and a rotor hub, wherein the wound stator assembly interacts with the rotor hub to drive the output shaft.

5. The motor assembly of claim 1, wherein the front bearing assembly is configured as a front ball bearing including a front inner race and a front outer race that define a track that receives a front ball, and the plastic front endbell is over-molded about the front outer race to apply an inward preloading force to the front outer race, and wherein the elasticity of the plastic front endbell operates to hold the front outer race of the front bearing assembly to restrict axial movement of the front bearing outer race.

6. The motor assembly of claim 5, wherein the rear bearing assembly is configured as a rear ball bearing including a rear inner race and a rear outer race that define a track that receives a rear ball, and the plastic rear endbell is over-molded about the rear outer race to apply an inward preloading force to the rear outer race oppositely from the preloading force applied to the front outer race, and wherein the elasticity of the plastic rear endbell operates to hold the rear outer race of the rear bearing assembly to restrict axial movement of the rear bearing outer race.

7. The motor assembly of claim 6, further comprising a preloading force mechanism that imparts opposing outward forces on the front inner race versus the rear inner race.

8. The motor assembly of claim 6, wherein the output shaft includes a shoulder that interacts against the front or rear inner race to apply an outward preloading force to said front or rear inner race oppositely from the preloading force applied to an opposing one of the outer races.

9. The motor assembly of claim 8, wherein the preloading force mechanism includes a spring that applies an outward spring force on the output shaft to urge the shoulder against said front or rear inner race to apply the outward preloading force against said front or rear inner race.

10. The motor assembly of claim 9, wherein the spring is positioned against the other of the rear or front inner race the to apply an outward preloading force against the other of the front or rear inner race oppositely from the preloading force applied to the opposing outer race.

11. The motor assembly of claim 6, wherein the output shaft includes a front shoulder that interacts against the front inner race to apply an outward preloading force to the front inner race oppositely from the preloading force applied to the front outer race.

12. The motor assembly of claim 11, wherein the output shaft includes a rear shoulder that interacts against the rear inner race to apply an outward preloading force to the rear inner race oppositely from the preloading force applied to the rear outer race, wherein the output shaft is sized such that when the output shaft is incorporated into the motor assembly with the over-molded plastic front and rear endbells, the output shaft is placed under load to apply the outward preloading forces on the front inner race and the rear inner race.

13. The motor assembly of claim 11, wherein the preloading force mechanism includes a spring that applies an outward spring force on the output shaft to urge the front shoulder against the front inner race to apply the outward preloading force against the front inner race.

14. The motor assembly of claim 13, wherein the spring is positioned against the rear inner race the to apply an outward preloading force against the rear inner race oppositely from the preloading force applied to the rear outer race.

15. A motor assembly comprising:
a motor that drives an output shaft;
a front endbell assembly fixed to a front end of the motor, the front endbell assembly including a plastic front endbell and a front bearing assembly through which a driving end of the output shaft extends, wherein the plastic front endbell is over-molded about the front bearing assembly and elasticity of the plastic front endbell operates to preload the front bearing assembly to restrict axial movement of the front bearing assembly; and
a rear endbell assembly fixed to a rear end of the motor opposite from the front end, the rear endbell assembly including a plastic rear endbell and a rear bearing assembly into which a rear end of the output shaft extends, wherein the plastic rear endbell is over-molded about the rear bearing assembly and elasticity of the plastic rear endbell operates to preload the rear bearing assembly to restrict axial movement of the rear bearing assembly;
wherein the front bearing assembly is configured as a front ball bearing including a front inner race and a front outer race that define a track that receives a front ball, and the plastic front endbell is over-molded about the front outer race to apply an inward preloading force to the front outer race, and wherein the elasticity of the plastic front endbell operates to hold the front outer race of the front bearing assembly to restrict axial movement of the front bearing outer race;
wherein the rear bearing assembly is configured as a rear ball bearing including a rear inner race and a rear outer race that define a track that receives a rear ball, and the plastic rear endbell is over-molded about the rear outer race to apply an inward preloading force to the rear outer race oppositely from the preloading force applied to the front outer race, and wherein the elasticity of the plastic rear endbell operates to hold the rear outer race of the rear bearing assembly to restrict axial movement of the rear bearing outer race; and
wherein the output shaft includes a shoulder that interacts against the front or rear inner race to apply an outward preloading force to said front or rear inner race oppositely from the preloading force applied to an opposing one of the outer races.

16. A motor assembly comprising:
a motor that drives an output shaft;
a front endbell assembly fixed to a front end of the motor, the front endbell assembly including a plastic front endbell and a front bearing assembly through which a driving end of the output shaft extends, wherein the plastic front endbell is over-molded about the front bearing assembly and elasticity of the plastic front endbell operates to preload the front bearing assembly to restrict axial movement of the front bearing assembly; and
a rear endbell assembly fixed to a rear end of the motor opposite from the front end, the rear endbell assembly including a plastic rear endbell and a rear bearing assembly into which a rear end of the output shaft extends, wherein the plastic rear endbell is over-molded about the rear bearing assembly and elasticity of the plastic rear endbell operates to preload the rear bearing assembly to restrict axial movement of the rear bearing assembly;
wherein the front bearing assembly is configured as a front ball bearing including a front inner race and a front outer race that define a track that receives a front ball, and the plastic front endbell is over-molded about the front outer race to apply an inward preloading force to the front outer race, and wherein the elasticity of the plastic front endbell operates to hold the front outer race of the front bearing assembly to restrict axial movement of the front bearing outer race;

wherein the rear bearing assembly is configured as a rear ball bearing including a rear inner race and a rear outer race that define a track that receives a rear ball, and the plastic rear endbell is over-molded about the rear outer race to apply an inward preloading force to the rear outer race oppositely from the preloading force applied to the front outer race, and wherein the elasticity of the plastic rear endbell operates to hold the rear outer race of the rear bearing assembly to restrict axial movement of the rear bearing outer race; and wherein the output shaft includes a front shoulder that interacts against the front inner race to apply an outward preloading force to the front inner race oppositely from the preloading force applied to the front outer race.

* * * * *